Jan. 2, 1923. Re. 15,515
G. HAISS.
WAGON LOADER.
ORIGINAL FILED JUNE 29, 1920.
3 SHEETS-SHEET 1
Fig. 1,
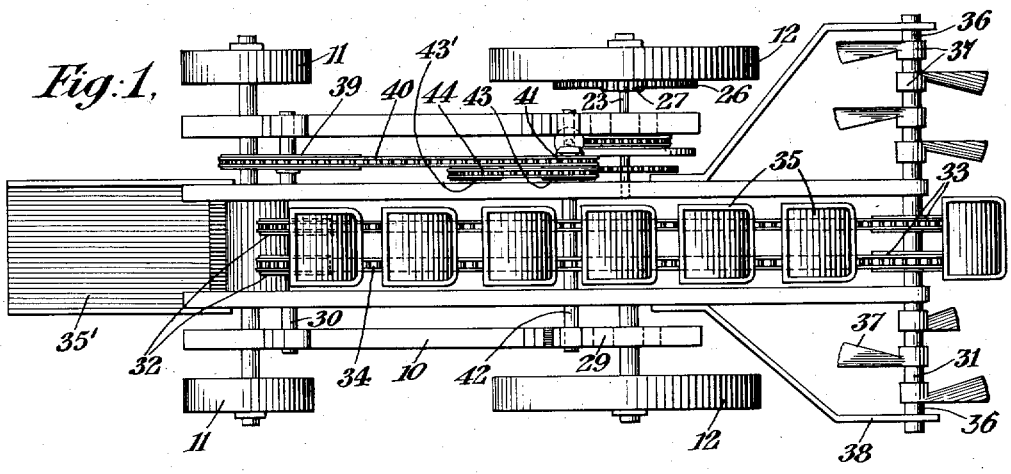
Fig. 2,
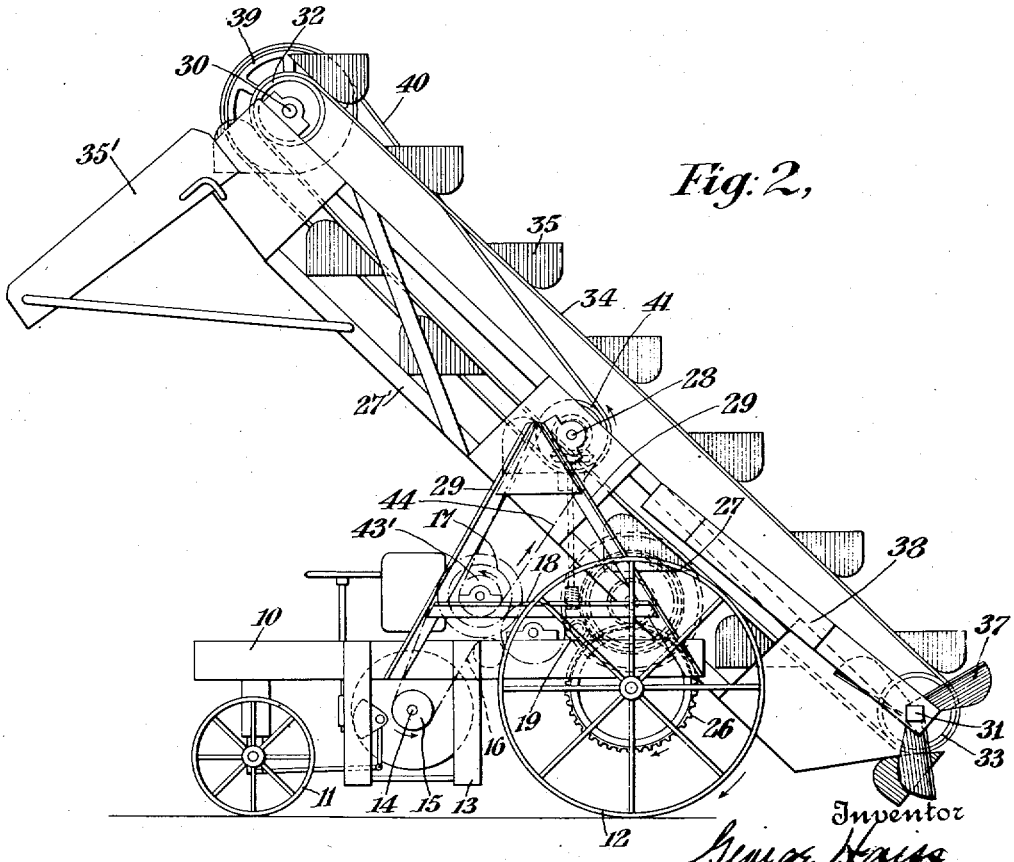
Inventor
George Haiss
By his Attorneys
Williams & Pritchard Jan. 2, 1923. Re. 15,515
G. HAISS.
WAGON LOADER.
ORIGINAL FILED JUNE 29, 1920. 3 SHEETS-SHEET 2
Fig: 3,
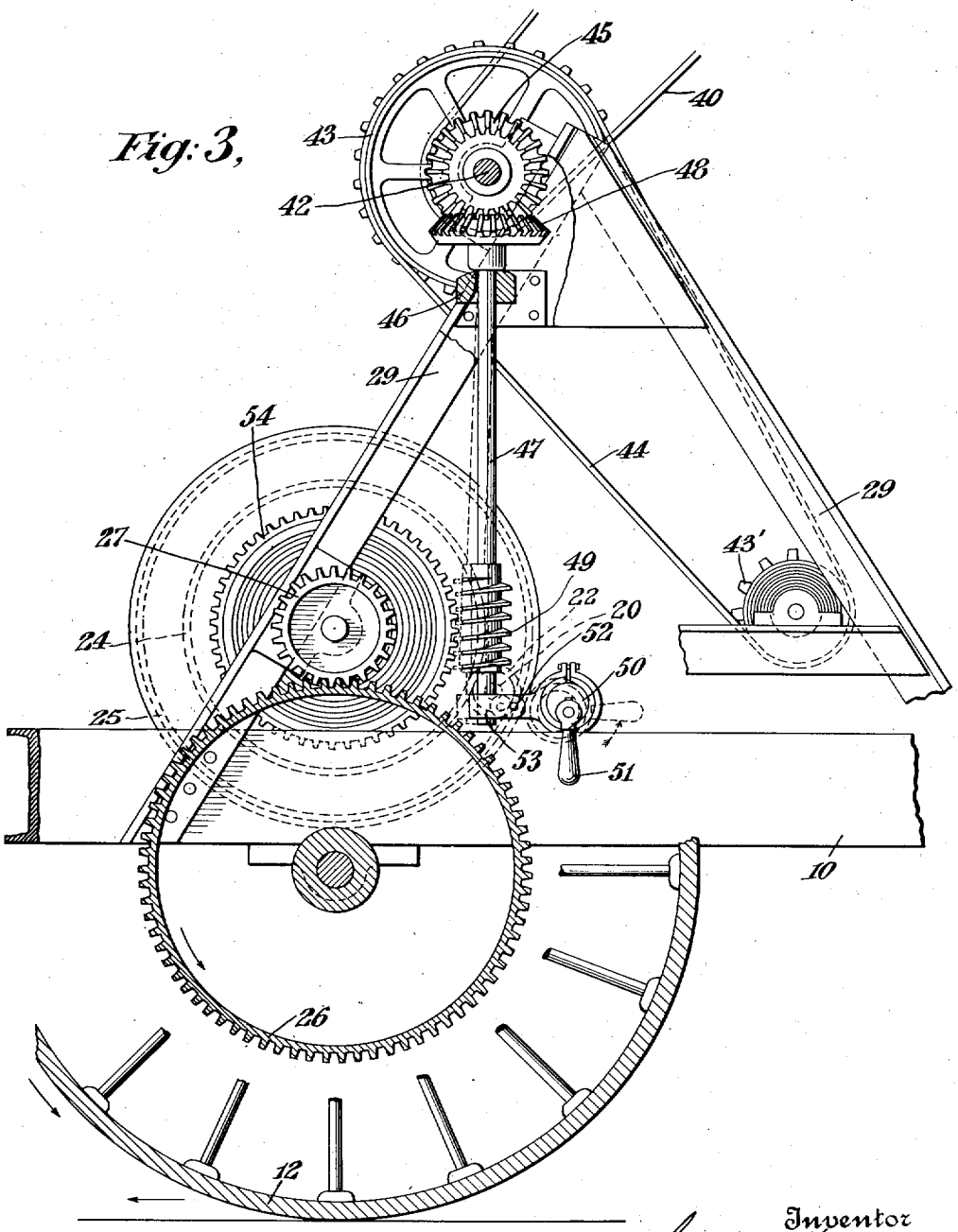
Inventor
George Haiss
By his Attorneys
Williams & Pritchard Jan. 2, 1923. Re. 15,515
G. HAISS.
WAGON LOADER.
ORIGINAL FILED JUNE 29, 1920. 3 SHEETS-SHEET 3
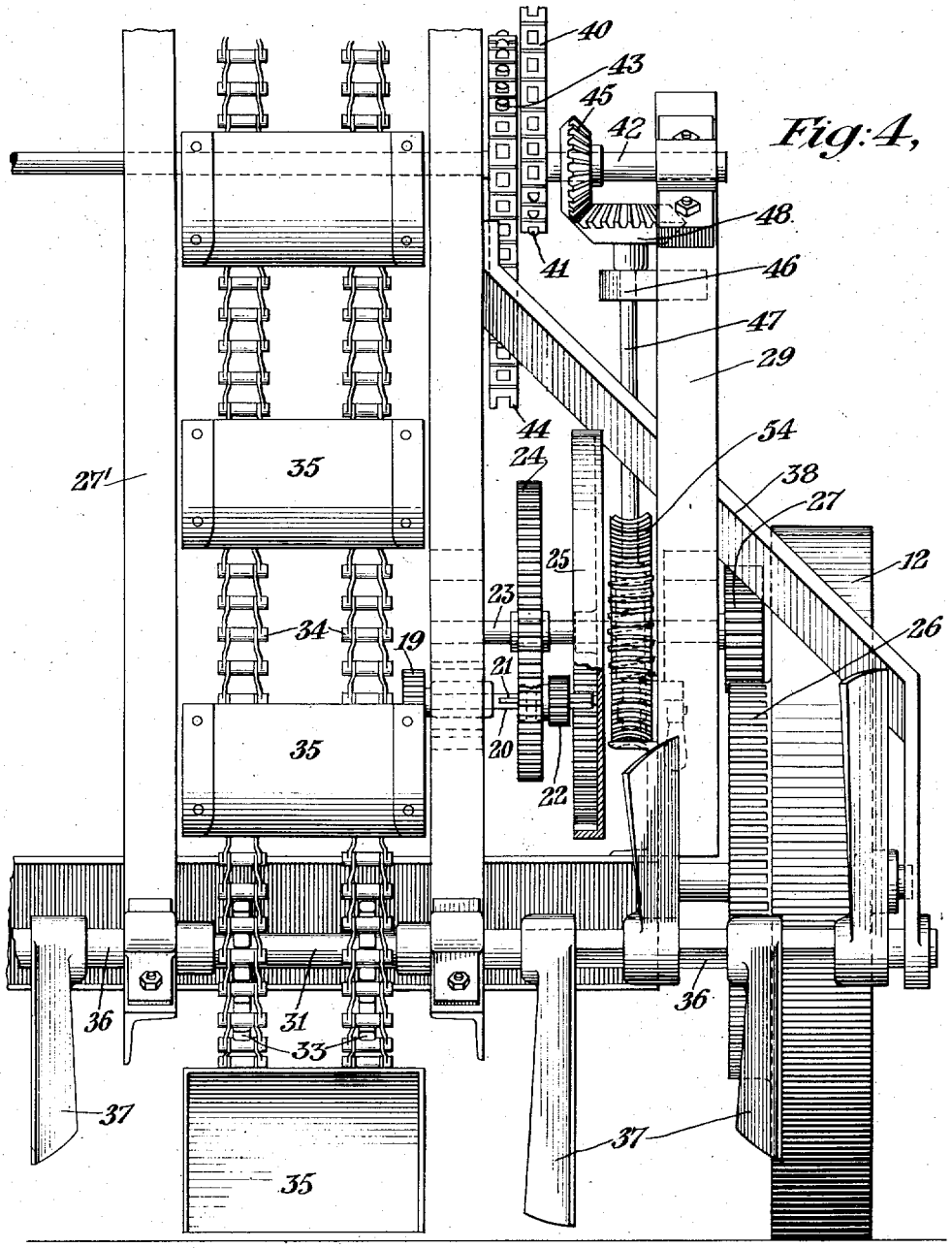
Fig: 4,
Inventor
George Haiss
By his Attorneys
Williams & Pritchard Reissued Jan. 2, 1923. Re. 15,515

UNITED STATES PATENT OFFICE.

GEORGE HAISS, OF NEW YORK, N. Y.

WAGON LOADER.

Original No. 1,345,172, dated June 29, 1920, Serial No. 292,825, filed April 26, 1919. Application for reissue filed August 15, 1921. Serial No. 492,508.

*To all whom it may concern:*

Be it known that I, GEORGE HAISS, a citizen of the United States, residing in the city of New York, borough of the Bronx, county of Bronx, and State of New York, have invented certain new and useful Improvements in Wagon Loaders, of which the following is a specification.

The present invention relates to new and useful improvements in wagon-loading devices, and has for its primary object to provide a device of this character which is automatic in its operation.

A further object of the invention is to provide a device of this character in which the operation is continuous so long as there is any material to be operated upon.

A further object of the invention is to provide a machine particularly adapted to operate upon piled material, and to provide said machine with propelling means for continuously moving the machine into the pile of material upon which it is working.

A further object of the invention is to provide means for feeding the piled material laterally into the path of the buckets of the elevating conveyer.

With the above and other objects in view, reference is had to the accompanying drawings in which—

Figure 1 is a top plan view of the machine.

Figure 2 is a side elevation thereof.

Figure 3 is a fragmentary sectional view.

Figure 4 is a rear elevation.

Referring more particularly to the drawings, the device comprises a frame 10, which is mounted upon steering wheels 11, and traction wheels 12. The reference character 13 designates a frame suspended from the main frame 10. The frame 13 is adapted to carry a motor of any suitable type not shown.

The motor shaft is designated by the reference character 14, and extending around a suitable pulley 15 carried by said motor shaft is a chain 16, shown in dotted lines in Figure 2, and said chain is adapted to drive a gear wheel 17, which in turn meshes with a gear wheel 18, which meshes with a gear wheel 19 carried by a shaft 20 shown in full lines in Figures 3 and 4. This train of gearing forms the means by which the shaft 20 is rotated and keyed to the shaft 20, as at 21, but freely slidable thereon, is a pinion 22.

Mounted in the frame 10, is a shaft 23, and keyed to said shaft is an external gear 24 and an internal gear 25. As best seen in Figure 4, one of the traction wheels 12 is provided with an external gear 26, and meshing with said external gear 26 is a pinion 27 which is mounted on the free outer end of the shaft 23. By this construction, it will be seen that when the pinion 22 is engaged with the external gear 24, the traction wheels 12 will be driven in one direction, and when the pinion 22 is engaged with the internal gear 25, the direction of movement of the traction wheels 12 will be reversed. It is to be understood that suitable mechanism not herein shown, will be employed to move the pinion 22 longitudinally of its shaft 20.

Superimposed upon and angularly disposed with respect to the frame 10, is a frame 27′, which is pivotally mounted as at 28, in stanchions 29 carried by said frame 10, and extending transversely of the frame 27′ at its upper end is a shaft 30, and at its lower end the frame 27′ is provided with a shaft 31. Each of the shafts 30 and 31 carries two spaced sprocket wheels 32 and 33, and passing around said sprocket wheels are endless chain members 34, on which are mounted elevator buckets 35. These elevator buckets 35 are adapted to discharge their contents into a chute or the like 35′ when at the top of the flight, as more clearly shown in Figures 1 and 2.

As shown in Figures 1 and 4, the lower shaft 31 is extended on opposite sides of the machine as at 36, and secured to said extended portions 36 of the shaft 31 are digging elements 37, which are angularly disposed in such a manner that when they engage the material operated on the same is moved centrally of the device to a position where it will be scooped up by the buckets 35 and elevated the desired height dependent upon the adjusted position of the frame 27′. These digging elements 37 are angularly disposed with relation to the longitudinal center of the frame 10, and also with respect to each other, so that as the shaft 31 rotates, the said digging elements 37 will successively engage the pile of material operated upon as above described.

The reference character 38 designates a frame, which is connected at its upper end to the conveyer frame 27′, and has its lower end provided with a perforation for the reception of the free end of the shaft extensions 36.

The upper shaft 30 is provided with a sprocket wheel 39, and passing around said sprocket wheel 39 is a driving chain 40, said driving chain also passing around a sprocket wheel 41 carried by a transversely extending shaft 42. Carried by the transversely extending shaft 42, is a sprocket wheel 43, and passing therearound is a chain 44, operatively connected with a sprocket 43′ which is adapted to be rotated by a motor, not shown, hereinbefore referred to. By this construction it will be seen that the conveyer chain members 34 are driven by rotation of the shaft 30, which is obtained through the medium of the chain 40, the sprocket wheel 41, the sprocket wheel 43, the chain 44 and the sprocket 43′.

The mechanism for propelling the loader at reduced speed and in a direction in which it will be continuously moved into the pile of material being operated upon, is clearly shown in Figures 3 and 4, and with reference to said figures, it will be seen that the shaft 42 is provided with a bevel gear 45, which is fixed thereto and adapted to rotate therewith.

Secured to one of the stanchions 29 is a bracket bearing 46 and suspended in said bracket bearing 46 and so arranged therein as to have a slight swinging movement, is a vertical shaft 47. The upper end of the shaft carries a bevel gear 48, which is adapted to rotate therewith, and secured near its lower end to the shaft 47, is a worm gear 49.

Mounted on the frame 10, is a cam member 50, which is operated by means of a handle 51, and pivotally connected to said cam, as at 52, is a collar 53, the said collar being adapted to receive the lower end of the shaft 47.

By this construction, it will be seen that as the cam handle 51 is rocked, as shown by the arrow and the dotted lines in Figure 3, the worm gear 49 will be moved into and out of engagement with the gear 54, which is carried by the shaft 23, and is adapted to rotate the same, and through the medium of the pinion 27 heretofore mentioned, drive the traction wheels 12.

Having thus described the invention, the operation thereof is as follows: When the pinion 22 is engaged with the external gear 24, the machine will travel in the forward direction, and when the pinion 22 is engaged with the internal gear 25, the direction of travel of the machine is reversed and the speed thereof is materially decreased. This method of propulsion is intended only for transportation of the machine from place to place when the same is not in use.

In order that the buckets may at all times be in a position convenient to the material to be elevated, it is desirous that the machine be moved at a considerably reduced speed toward the pile of material continuously during the operation of the elevator flight, and this is accomplished by movement of the cam handle 51 to the dotted line position in Figure 3, in which position the worm gear 49 engages the gear 54 and drives the traction wheel 12 in the reverse direction, it being understood, of course, that the pinion 22 will have been first adjusted to the neutral position shown in Figure 4. Inasmuch as it is only desirous to drive the machine at this greatly reduced speed and in a reversed direction during the operation thereof upon a pile of material, the last mentioned mechanism is so arranged that it derives its power from the conveyer or elevator-driving mechanism, and would, therefore, only be operable during the operation of said conveyer or elevator, and is likewise dependent thereon for its power.

As the machine is continuously driven into the pile of material to be operated upon, it will be seen that the digging elements 37 will segregate the material and move it forwardly with respect to the travel of the machine to a point approximately parallel with the longitudinal center of the machine, in which position it will be engaged by the buckets 35 of the conveyer or elevator and removed.

By this construction and arrangement of parts, it is obvious that the machine herein described is practically continuous in its operation and is capable of greater capacities than are machines in which it is necessary to stop the elevating mechanism in order that they may be adjusted from time to time with relation to the pile of material operated upon.

I claim:

1. In a wagon loader, a frame, traction wheels for supporting the frame, a conveyer carried by the frame, driving mechanism for said conveyer, driving mechanism for the traction wheels and normally out of operative connection with the power-supplying means of the loader, and a vertically disposed shaft driven by the conveyer-driving mechanism and adapted to be engaged with the driving mechanism of the traction wheels to drive the latter from the conveyer-driving mechanism.

2. In a wagon loader, a frame, a plurality of traction wheels for supporting said frame, a conveyer carried by the frame, driving means for said conveyer, a power plant for driving the conveyer and the traction wheels in one direction, and means operated by the conveyer and adapted to drive the traction wheels in the opposite direction, substantially as described.

3. A wagon loader comprising a frame, traction wheels for supporting said frame, a supplemental frame superimposed with respect to the first-mentioned frame, a conveyer flight carried by said superimposed frame, means for driving said conveyer flight, means for driving the traction wheels in one direction, auxiliary driving means operatively connected with the driving means of the conveyer and adapted to drive the traction wheels in an opposite direction. and means for operatively connecting the auxiliary driving means with the traction wheels.

4. In a wagon loader, a frame, traction wheels for supporting the frame, a conveyer carried by the frame, conveyer-driving mechanism, traction wheel driving mechanism normally out of operative connection with said conveyer-driving mechanism, a power plant adapted to drive said conveyer-driving mechanism, and means adapted to operatively connect the conveyer-driving mechanism with the traction wheel driving mechanism whereby the loader is propelled simultaneously with the operation of the conveyer.

5. In a wagon loader, a frame, traction wheels for supporting the frame, a conveyer carried by the frame, conveyer-driving mechanism, traction wheel driving mechanism, a power plant adapted to drive said conveyer-driving mechanism, means adapted to operatively connect the conveyer-driving mechanism with the traction wheel driving mechanism whereby the loader is propelled simultaneously with the operation of the conveyer, the traction wheel driving mechanism being normally disconnected from the conveyer-driving mechanism, and means adapted to be driven by said power plant for driving said traction wheel driving mechanism whereby the loader is propelled irrespective of the operation of said conveyer-driving mechanism.

6. A wagon loader adapted to elevate material from a pile into a wagon comprising a frame, traction wheels for said frame, an inclined conveyer, a shaft arranged transversely with respect to said conveyer, a plurality of blades carried by said shaft at each side of said conveyer, the blades at one side of said conveyer having their faces oppositely inclined to those of the blades at the opposite side of said conveyer, and means for transmitting power of rotation to said traction wheels and to said shaft simultaneously whereby the loader is moved toward the material to be conveyed and the shaft is rotated causing said blades to deliver a succession of blows to the material whereby the same is loosened and moved forwardly with respect to the travel of the loader and toward the conveyer from both sides thereof, and means for operating the conveyer to remove the material acted upon by said blades.

7. A wagon loader adapted to elevate material from a pile into a wagon comprising a frame, traction wheels for said frame, an inclined conveyer having buckets thereon adapted to receive the material at the lower end of the conveyer, a shaft extending transversely of said conveyer, a plurality of radially disposed blades carried by said shaft at each side of said conveyer, the blades at one side of said conveyer having their faces oppositely inclined to those of the blades at the opposite side of said conveyer, means for imparting power of rotation to said driving wheels whereby the loader is moved toward the pile of material to be conveyed, means for driving said conveyer, and means for rotating said shaft in a direction opposite to the rotation of said driving wheels whereby a succession of blows is delivered by said blades to the material to be loaded and the material moved forwardly with respect to said conveyer and laterally toward the same, the material thus moved being collected by the buckets on said conveyer.

8. A wagon loader adapted to elevate material from a pile into a wagon comprising an inclined conveyer adapted to receive material at the lower end thereof, means for driving said conveyer, a shaft extending transversely of said conveyer and projecting from each side thereof, a plurality of laterally disposed blades carried by said shaft at each side of said conveyer, the blades at one side of said conveyer having their faces oppositely inclined to those of the blades at the opposite side of said conveyer, means for rotating said shaft in such a direction as to exert upwardly directed impacts upon the material whereby the same is loosened and moved forwardly with respect to the conveyer and into the path of the conveyer to be collected and elevated thereby.

9. A wagon loader adapted to elevate material from a pile into a wagon comprising a frame, traction wheels for said frame, an inclined conveyer adapted to receive material at the lower end thereof, a shaft extending transversely of said conveyer and projecting from each side thereof to the path of travel of the traction wheels, a plurality of radially disposed blades carried by said shaft at each side of said conveyer, the blades at one side of the conveyer having their faces oppositely inclined to those of the blades at the opposite side of the conveyer, means for driving said traction wheels whereby the loader is moved bodily toward the pile of material, means for rotating said shaft whereby said blades are caused to deliver a succession of blows to the material and move the same forwardly with respect to the travel of the loader and laterally toward the conveyer out of the path of travel of the traction wheels, and means for driving said conveyer whereby the material which has been moved toward the conveyer is collected and elevated thereby.

10. A wagon loader adapted to elevate material from a pile into a wagon comprising an inclined conveyer, means for driving the conveyer, means for moving the conveyer forwardly, and means for successively imparting upwardly directed impacts to the material to loosen the same, the last named means being utilized also to move the loosened material forwardly with respect to the conveyer and into the path of travel of the same to be collected and elevated thereby.

In testimony whereof, I have affixed my signature to this specification.

GEORGE HAISS.